United States Patent [19]

Greene et al.

[11] Patent Number: 4,501,881
[45] Date of Patent: Feb. 26, 1985

[54] PREPARATION OF POLYAMIDE BY CONTACTING DIAMINE, DINITRILE, WATER, DICARBOXYLIC ACID

[75] Inventors: Janice L. Greene, Chagrin Falls; Roman Loza, Solon, both of Ohio

[73] Assignee: The Standard Oil Company, Cleveland, Ohio

[21] Appl. No.: 365,808

[22] Filed: Apr. 5, 1982

[51] Int. Cl.³ .............................................. C08G 69/00
[52] U.S. Cl. .................................... 528/336; 528/335; 528/339
[58] Field of Search ...................... 528/336, 335, 339

[56] References Cited

U.S. PATENT DOCUMENTS 2,245,129  6/1941  Greenewalt ......................... 528/336
3,847,876  11/1974  Onsager ................................ 526/71

Primary Examiner—Harold D. Anderson
Attorney, Agent, or Firm—David P. Yusko; John E. Miller, Jr.; Larry W. Evans

[57] ABSTRACT

This invention describes a process for preparing polyamides comprising contacting a dinitrile, a diamine and water in the presence of a dicarboxylic acid. In one embodiment, nylon-6,6 is prepared by contacting adiponitrile, hexamethylene diamine and water in the presence of adipic acid.

10 Claims, No Drawings

PREPARATION OF POLYAMIDE BY CONTACTING DIAMINE, DINITRILE, WATER, DICARBOXYLIC ACID

BACKGROUND OF THE INVENTION

High molecular weight polyamides, i.e. nylon, are prepared by polymerization of a dinitrile, a diamine and water in the presence of a dicarboxylic acid.

Commercial processes for preparing nylons, which use diamines and dicarboxylic acids as raw materials are well known in the art. The commercial reaction may be represented by the following formula:

$$H_2NR''NH_2 + HOOCRCOOH \rightarrow \text{-}[NR''NHOCR\text{-}CO]_x\text{-} + 2H_2O$$

wherein R and R' are generally hydrocarbon groups. At an early date in the development of nylons it was proposed that linear polyamides be made by heating a reaction mixture comprising a dinitrile, a diamine and water, as disclosed in Greenwalt, U.S. Pat. No. 2,245,129. The procedure disclosed in the Greenwalt patent is carried out in two stages, the first stage comprising the heating of the reaction mixture in the closed reaction vessel until a low molecular weight polyamide is formed, and the second stage comprising subsequent heating of the precursor thus produced to form a higher molecular weight polyamide. Later patents, such as U.S. Pat. No. 3,847,876 provide for an improved process for preparing polyamides by contacting the dinitrile, diamine and water in the presence of ammonia. The polyamides thus produced, however, were, by commercial standards, of relatively poor quality and of only intermediate molecular weight and, the commercial development of processes for the preparation of nylons, such as nylon-6,6 has followed the diamine-dicarboxylic acid route described above.

It is an object of the present invention to provide an improved process for preparing high molecular weight polyamides directly from diamines and dinitriles. It is a further object of this invention to provide a process for producing nylon-6,6 from hexamethylene diamine and adiponitrile.

SUMMARY OF THE INVENTION

It has now been discovered that a polyamide can be prepared by contacting a diamine, a dinitrile and water in the presence of a dicarboxylic acid.

In a preferred embodiment of this invention, the dicarboxylic acid used as the catalyst/reactant for this process is the molecular equivalent of the dinitrile. For example, adiponitrile, hexamethylene diamine, water and adipic acid will react to form nylon-6,6.

DETAILED DESCRIPTION

In accordance with this invention, substantially equimolar quantities of a diamine, e.g. hexamethylene diamine, and a dinitrile, e.g. adiponitrile, are heated in a controlled manner in the presence of water. This process can be conducted in either a continuous or a batch manner.

It is believed that this process proceeds on the following basis:

$$NC\text{-}R\text{-}CN + HR'N\text{-}R''\text{-}NR'H + 2H_2O \xrightarrow{HOOC\text{-}R\text{-}COOH} \text{-}[C(O)\text{-}R\text{-}C(O)\text{-}N\text{-}R''\text{-}N]\text{-} + 2NH_2R'$$

(with R' substituents on N)

wherein R and R'' are divalent organic radicals, and R' is hydrogen or a univalent organic radical.

The diamines suitable for use in the reaction are the diamines containing from 1 through 20 carbon atoms. The diamines may be aliphatic, straight chain or branched, or aromatic or they may contain a heteroatom. Also useful are substituted diamines, provided the substituents are inert under the reaction conditions. Preferably the diamines are the aliphatic or aromatic diamines which contain from 4 through 12 carbon atoms such as, tetramethylene diamine, hexamethylene diamine, 1,12-dodecane diamine, p-xylene diamine and the like, i.e. diamines of the formula:

$$R'HN\text{-}R''\text{-}NHR'$$

wherein R'' is an alkylene or arylene group containing 4 to 12 carbon atoms and R' is hydrogen or a univalent organic radical.

The dinitriles which may be used in accordance with the invention in the reaction with a diamine and water are dinitriles containing from 2 through 20 carbon atoms. The dinitriles may be aliphatic, straight chain or branched, or aromatic or they may contain a heteroatom. Also useful are substituted dinitriles so long as the substituents are inert under the reaction conditions. Preferably, however, the dinitriles are the aliphatic or aromatic dinitriles which contain from 4 through 12 carbon atoms, such as, succinonitrile, adiponitrile, suberonitrile, sebaconitrile, 1,12-dodecane dinitrile, terephthalonitrile, methyl glutaronitrile and the like; i.e. dinitriles of the formula:

$$NC\text{-}R\text{-}CN$$

wherein R is an alkylene or arylene group of 2 to 10 carbon atoms.

In the most preferred aspect of the invention, the nitrile is adiponitrile and the amine is hexamethylene diamine and the polyamide produced is nylon-6,6. Generally, the molar ratio of the dinitrile to the diamine should be about 1:1. An excess of either of these reactants will act as a chain terminator and limit the molecular weight of the resultant polyamide. All of the diamine and dinitrile may be initially present in a mixture with the water, or the diamine and water may be continuously added to the reaction mixture as the reaction proceeds.

The amount of water needs to be at least that stoichiometrically required for the reaction, i.e. 2 moles of water for each mole of dinitrile. Generally speaking, it is desirable to have a slight molar excess of water in the reaction. However, excess water must be removed during the course of the process and this removal is an added expense which should be avoided as much as possible. Thus, the preferred water content is 2 to 10 moles of water per mole of dinitrile.

It has also been discovered that the addition of a dicarboxylic acid acts as a reactant/catalyst for this process. The dicarboxylic acid acts as a catalyst in that it speeds up the reaction and it acts as a reactant in that it becomes part of the polyamide. This is commercially advantageous since not only is the reaction sped up but also there is no expense involved in seperating the dicarboxylic acid from the polyamide after the reaction is complete. Dicarboxylic acids which are especially useful in this process described herein can be represented by the following formula:

HOOC—R'''—COOH wherein R''' is an alkylene or arylene group containing from 1 through 18 carbon atoms.

In one embodiment of the invention, the dicarboxylic acid is the molecular equivalent of the dinitrile. In other words, if the dinitrile is represented by the formula:

NC—R—CN and the dicarboxylic acid is represented by the formula:

HOOC—R'''—COOH then R and R''' represent the same divalent organic radical. The amount of the catalyst can vary from 0.1–55 mole % (based on the moles of diamine). The preferred level is between 5–40 mole %. Generally, since the dicarboxylic acid replaces the dinitrile in the process, the ratio of the moles of dinitrile plus the moles of dicarboxylic acid to the moles of diamine should remain about 1:1. This ratio can be varied slightly so as to control the molecular weight of the resultant polyamide, as well as, the nature of the end groups.

This process is conducted at an elevated temperature. The preferred practice of the invention, the temperature is between 75° and 350° C., more preferably 150° to 325° C. The temperature is closely related to the time required for the reaction. At low temperatures, it will take longer for the products to form than at high temperatures.

This reaction is normally carried out in a pressure vessel in the absence of air. This reaction can be carried out at subatmospheric, atmospheric or superatmospheric pressure. Normally, the reaction is initially run at autogenous pressure with a later reduction to atmospheric or subatmospheric pressure. However, it is within the scope of this invention to carry out the initial reaction at constant pressure by applying an inert gas pressure to the system and adjusting this pressure as the reaction proceeds. The pressure can be maintained with a gaseous reactant or a gas inert to the reaction or some combination thereof.

In order to produce high molecular weight polyamides, it is important to conduct this process under specific, controlled stages. It is generally known from the prior art, i.e. U.S. Pat. No. 3,847,876, that polymerization by stages over a certain temperature/pressure profile will result in the best products. This temperature/pressure profile will generally depend upon the specific reactants used and product desired. A temperature/pressure profile which works particularly well for forming nylon-6,6 from adiponitrile, hexamethylene diamine, water and adipic acid is as follows. During the first stage of the reaction the temperature is maintained at 200° to 300° C., preferably at 240° to 270° C., under autogenous pressure for 2 to 4 hours. The pressure is gradually reduced to atmospheric pressure as the temperature is gradually increased to between 270° and 310° C. The final stage at atmospheric pressure is under a flow of inert gases or at subatmospheric pressure.

From the commercial standpoint, the possibility of producing high quality fiber grade nylons from diamines and dinitriles is of significance because dinitriles can be readily prepared from mononitriles, e.g. by reductive dimerization procedures, such as described in Holland, U.S. Pat. No. 3,496,216, and the diamine can be easily produced from the dinitrile in a conventional manner by well known reduction, e.g. hydrogenation procedures. For example, adiponitrile can be directly produced from acrylonitrile by reductive dimerization and hexamethylene diamine can be directly produced by hydrogenating adiponitrile.

The polyamides produced herein may be used in any application calling for a nylon-type polymer. For example, these polymers can be used as fibers, plastics, films and molding compounds.

SPECIFIC EMBODIMENTS

The following examples will further illustrate this invention.

EXAMPLE 1

A mixture containing 34.8 grams (0.30 mole) of hexamethylene diamine, 29.2 grams (0.27 mole) of adiponitrile, 4.4 grams (0.03 mole) of adipic acid and 21.6 grams, (1.2 mole) of water was sealed inside a 600 milliliter stainless steel autoclave. The vessel was flushed several times with nitrogen and then pressurized to 100 psig. The mixture was heated to 240° C. and maintained at this temperature and under autogenous pressure for 2 hours. At the end of 2 hours, the pressure was vented to 200 psig and the temperature was increased 260° C., over a 1-hour period. The pressure was then vented to 100 psig and the temperature was increased to 275° C., over a 30-minute period. The mixture was kept at this temperature and pressure for 30 minutes. Total time for the reaction, exclusive of warm up and cool down, was 4 hours. Analysis of the product by IR/NMR spectroscopy confirmed the presence of a polyamide. This polyamide had an intrinsic viscosity of 0.36 dl/g. (90% formic acid).

COMPARATIVE EXAMPLE A

The procedure of Example 1 was repeated except that no adipic acid was added. The product was identified as a polyamide but it only had an intrinsic viscosity of 0.17.

EXAMPLE 2

The procedure of Example 1 was repeated except for the following changes. A mixture of 25.9 grams (0.24 mole) of adiponitrile, 8.8 grams (0.06 mole) of adipic acid, and 16.2 grams (0.90 mole) of water were used. The reaction was carried out at 250° C. A modified venting procedure was used. After 2 hours at 250° C. the pressure was vented to 600 psig. The venting was continued at 30 minute intervals until the pressure had reached atmospheric (5 venting steps, total time was 2 hours). The temperature was allowed to rise to 266° C. during the venting. The final 30 minutes of the reaction were conducted under the following conditions: 5 minutes under a nitrogen flush, 10 minutes under 40 psig of nitrogen and the final 15 minutes under a nitrogen flush. During the final 30 minutes the temperature was allowed to rise to 276° C. The total time for the reaction, exclusive of heat up and cool down time, was 4.5 hours.

The product was a polyamide which had an intrinsic viscosity of 0.51.

COMPARATIVE EXAMPLE B

The procedure of Example 2 was repeated except that no adipic acid was used. The resultant polyamide had an intrinsic viscosity of 0.15.

EXAMPLE 3

The procedure of Example 2 was repeated except that 21.6 grams (1.2 mole) of water was used. The resultant polyamide had an intrinsic viscosity of 0.57.

COMPARATIVE EXAMPLE C

The procedure of Example 3 was repeated except that no adipic acid was used. The resultant polyamide had an intrinsic viscosity of 0.37.

EXAMPLE 4

The procedure of Example 2 was repeated except that 32.4 grams (1.8 mole) of water was used. The resultant polyamide had an intrinsic viscosity of 0.50.

Although only a few embodiments of this invention have been specifically described above, it should be appreciated that many additions and modifications can be made without departing from the spirit and scope of the invention. These and all other modifications are intended to be included within the scope of this invention, which is to be limited only by the following claims.

We claim:

1. A process for preparing a polyamide comprising contacting a diamine, a dinitrile and water in the presence of a dicarboxylic acid.

2. The process of claim 1 wherein the diamine is an aliphatic diamine.

3. The process of claim 1 wherein the dinitrile is an aliphatic dinitrile.

4. The process of claim 1 wherein the diamine is represented by the formula

NC—R—CN wherein R is an alkylene or arylene group comtaining 2 to 12 carbon atoms.

5. The process of claim 4 wherein the diamine is hexamethylene diamine.

6. The process of claim 1 wherein the dinitrile is represented by the formula

R'HNR"NHR' wherein R" is an alkylene or arylene group containing 2 to 12 carbon atoms and R' is hydrogen or a univalent organic radical.

7. The process of claim 1 wherein the dinitrile is adiponitrile.

8. The process of claim 1 wherein the dicarboxylic acid is represented by the formula

HOOC—R'"—COOH wherein R'" is an alkylene or arylene group containing 2 to 12 carbon atoms.

9. The process of claim 1 wherein the dinitrile is represented by the formula:

NC—R—CN and the dicarboxylic acid is represented by the formula

HOOC—R'"—COOH wherein R and R'" comprise the same divalen organic radical.

10. The process of claim 9 wherein R and R'" are selected from the group consisting of alkylene arylene radicals containing 2 to 10 carbon atoms.